(12) United States Patent
Kim et al.

(10) Patent No.: US 12,129,128 B2
(45) Date of Patent: Oct. 29, 2024

(54) CLEANER DEVICE FOR BELT CONVEYOR (71) Applicant: HANIL MACHINERY CO., LTD., Gwangju (KR)

(72) Inventors: Hee Gon Kim, Gwangju (KR); Cheol Young An, Boryeong-si (KR)

(73) Assignee: HANIL MACHINERY CO., LTD., Gwangju (KR)

( * ) Notice: Subject to any disclaimer, the term of this patent is extended or adjusted under 35 U.S.C. 154(b) by 0 days.

(21) Appl. No.: 18/013,512

(22) PCT Filed: Jan. 28, 2022

(86) PCT No.: PCT/KR2022/001562
§ 371 (c)(1),
(2) Date: Dec. 28, 2022

(87) PCT Pub. No.: WO2022/225149
PCT Pub. Date: Oct. 27, 2022

(65) Prior Publication Data
US 2024/0253909 A1 Aug. 1, 2024

(30) Foreign Application Priority Data
Apr. 23, 2021 (KR) .......... 10-2021-0053327

(51) Int. Cl.
B65G 45/12 (2006.01)
B65G 45/16 (2006.01)
(Continued)

(52) U.S. Cl.
CPC .................. B65G 45/16 (2013.01)

(58) Field of Classification Search
None
See application file for complete search history.

(56) References Cited

U.S. PATENT DOCUMENTS 3,949,866 A 4/1976 Pott
5,031,750 A * 7/1991 Barnes ............ B65G 45/22
198/497

(Continued)

FOREIGN PATENT DOCUMENTS

EP 1065158 1/2001
JP 59-158721 9/1984

(Continued)

OTHER PUBLICATIONS

PCT ISR dated May 4, 2022.
(Continued)

Primary Examiner — Kavel Singh (57) ABSTRACT

Proposed is a cleaner device for a belt conveyor. A plurality of scrapers adjacent to each other horizontally is provided, and remains in close contact with a surface of a belt of the belt conveyor by an elastic force of a plurality of pressing units. The adjacent scrapers include inclined parts that are in close contact with each other at opposite ends so that the ends can be maintained in close contact with each other, an injection part and a passage for supplying a lubricating liquid between the inclined parts that are in close contact with each other so that the lubricating liquid can move independently and smoothly according to the curve of the surface of the belt, and a storage part for storing the supplied lubricating fluid so that the lubricating fluid can be continuously supplied between the inclined parts in close contact with each other.

4 Claims, 6 Drawing Sheets (51) Int. Cl.
   *B65G 45/22* (2006.01)
   *B65G 45/24* (2006.01)

(56) References Cited

U.S. PATENT DOCUMENTS

| | | | |
|---|---|---|---|
| 5,213,197 A | 5/1993 | Mohri | |
| 5,355,992 A * | 10/1994 | Baig | B65G 45/22 198/497 |
| 5,722,528 A | 3/1998 | Dolan | |
| 5,931,280 A * | 8/1999 | Nissen | B65G 45/16 198/497 |
| 6,041,913 A | 3/2000 | Dolan | |
| 6,533,102 B2 * | 3/2003 | Franzoni | B65G 45/22 198/501 |
| 6,948,609 B2 * | 9/2005 | Finger | B65G 45/16 198/497 |
| 8,191,701 B2 * | 6/2012 | Bryl | B65G 45/22 198/495 |
| 8,348,046 B1 * | 1/2013 | Baumgardner | B65G 45/22 198/496 |

FOREIGN PATENT DOCUMENTS

| | | |
|---|---|---|
| JP | 2011-219257 | 11/2011 |
| JP | 2013023353 | 4/2013 |
| KR | 20-2000-0012056 | 7/2000 |
| KR | 20-0379715 | 3/2005 |
| KR | 10-0727108 | 1/2007 |
| KR | 10-2009-0059621 | 6/2009 |
| KR | 20-2009-0010629 | 10/2009 |
| KR | 10-1083438 | 11/2011 |
| KR | 10-2013-0083595 | 1/2012 |
| KR | 10-2016-0056706 | 5/2016 |
| KR | 10-2017-0110897 | 10/2017 |
| KR | 10-2305926 | 9/2021 |

OTHER PUBLICATIONS

Office Action from the Korean Intellectual Property Office dated Jun. 27, 2021.
Supplementary European Search Report mailed on Jun. 11, 2024.

* cited by examiner

CLEANER DEVICE FOR BELT CONVEYOR

CROSS-REFERENCE TO RELATED APPLICATIONS

The present application is a U.S. national phase application of PCT International Application PCT/KR2022/001562, which claims priority to Korean Patent Application No. 10-2021-0053327, filed on Apr. 23, 2021, the entire contents of each of which are herein incorporated by reference.

TECHNICAL FIELD

An embodiment of the present disclosure relates to a cleaner device removing foreign substances from a surface of a belt by using a scraper, the belt constituting a belt conveyor.

BACKGROUND ART

A cleaner device for a belt conveyor is used for removing various foreign substances that remain adhered to a surface of a belt of the belt conveyor. Generally, such a cleaner device is configured to remove foreign substances from a surface of a belt by using a scraper that is close contact with the surface of the circulating belt.

However, as the scraper is gradually worn out due to friction with the belt, a foreign substance removal effect may be reduced. In addition, since a close contact state of the scraper to the surface of the belt is required to be adjusted to an optimum level according to the wear of the scraper, inconvenience is inevitable in terms of maintenance, and work efficiency may be reduced. Meanwhile, when the surface of the belt is not uniform and is in a curved state, the scraper cannot be in close contact with the surface of the belt, so that there is a problem that removing of foreign substances cannot be smoothly performed.

As related arts, Korean Utility Model Publication No. 20-2000-0012056 (Jul. 5, 2000), Korean Utility Model No. 20-0379715 (Mar. 23, 2005), Korean Patent Application Publication No. 10-2009-0059621 (Jun. 11, 2009), Korean Patent No. 10-1083438 (Nov. 15, 2011), Korean Patent Application Publication No. 10-2013-0083595 (Jul. 23, 2013), Korean Patent Application Publication No. 10-2016-0056706 (May 20, 2016), and Korean Patent Application Publication No. 10-2017-0110897 (Oct. 12, 2017) may be referred to. In addition, Japanese Patent Publication No. 2011-219257 A (Nov. 4, 2011) may be referred to.

DISCLOSURE

Technical Problem

An embodiment of the present disclosure is to provide a cleaner device for a belt conveyor, the cleaner device being capable of automatically bringing a scraper into close contact with a surface of the belt of the belt conveyor with a predetermined pressure.

An embodiment of the present disclosure is to provide a cleaner device for a belt conveyor, the cleaner device having a plurality of scrapers and being capable of smoothly moving the plurality of scrapers such that the plurality of scrapers corresponds to a curve of a surface of a belt.

Technical Solution

According to an embodiment of the present disclosure, there is provided a cleaner device for a belt conveyor, the cleaner device including: a body 110; a movable member 120 provided on the body 110 such that the movable member 120 is capable of being moved in a vertical direction; a vertical moving unit 130 for moving the movable member 120; a scraper 160 which is disposed below the movable member 120 and which extends in a horizontal direction such that the scraper 160 has a predetermined length, the scraper 160 having a lower end part that is in contact with a surface of a circulating belt 12 of a belt conveyor 10, thereby removing foreign substances from the surface of the belt 12; and a pressing unit 140 including at least one of pressing units 140 provided on the movable member 120 and being configured to press the scraper 160 from above the scraper 160, the pressing unit 140 being configured to automatically maintain a pressing force on the scraper 160 so that the lower end part of the scraper 160 is in close contact with the surface of the belt 12. In the cleaner device configured as described above, the lower end part of the scraper 160 may be in contact with the surface of the belt 12 when the scraper 160 is moved downward, and the scraper 160 may be mounted on a side of the belt conveyor 10 such that a longitudinal direction of the scraper 160 intersects (for example, orthogonal to) a circulation direction of the belt 12.

Figure 4:
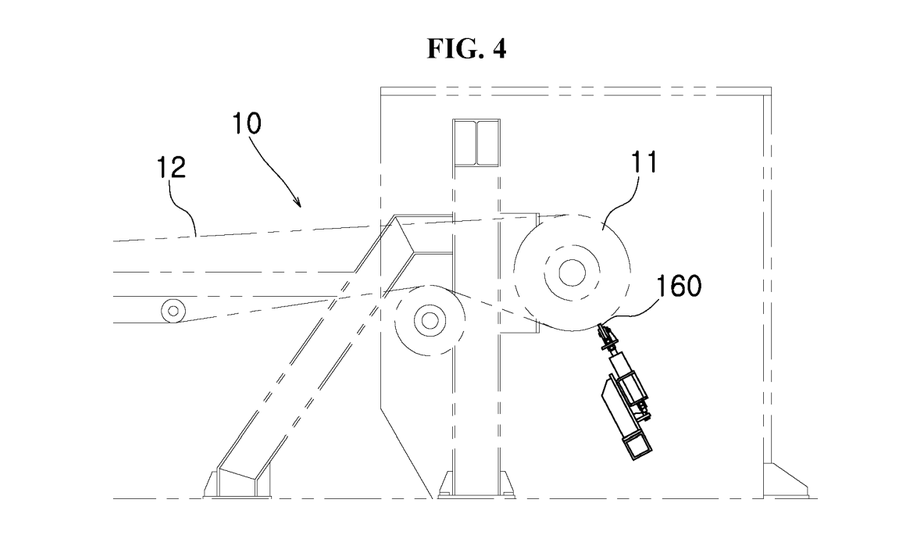
FIG. 4 is a conceptual view illustrating a state in which an example of the cleaner device according to an embodiment of the present disclosure is mounted on a side of a belt conveyor.

The vertical direction and the horizontal direction in the cleaner device may be directions (see FIG. 1) with respect to the cleaner device. Therefore, when the cleaner device is mounted upside down on the side of the belt conveyor 10 (see FIG. 4), the movement of the scraper 160 in a downward direction performed such that the lower end part of the scraper 160 is in contact with the surface of the belt 12 may be regarded as the movement of the scraper 160 in an upward direction when viewed from the belt conveyor 10 as a standard.

In the cleaner device, the body 110 may be provided with a guide hole 111 that extends in the vertical direction, a fastener 112 may be inserted into the guide hole 111 such that the fastener 112 is capable of being moved in the vertical direction along a guide of the guide hole 111, and the movable member 120 may be detachably coupled to the fastener 112.

The vertical moving unit 130 may include: a bracket 131 provided on the body 110 above the movable member 120; and a position controller 132 having an upper portion rotatably provided on the bracket 131 and having a lower portion screw-coupled to the movable member 120, the position controller 132 being configured to move the movable member 120 in the vertical direction according to a rotation direction thereof.

The pressing unit 140 may include: a moving shaft 141 that penetrates the movable member 120 such that the moving shaft 141 is capable of being moved in the vertical direction, the moving shaft 141 having an upper region that protrudes upward from an upper portion of the movable member 120 and having a lower region that protrudes downward from a lower portion of the movable member 120, and the moving shaft 141 having a lower end part of the lower region connected to the scraper 160; a stopping member 142 provided on the upper region of the moving shaft 141 and configured to limit a downward movement of the moving shaft 141 by being in contact with the upper portion of the movable member 120; a catching member 143 provided on the lower region of the moving shaft 141; and an elastic body 144 inserted into an outer side of the moving shaft 141 while being in a state in which both end parts of the elastic body 144 are supported by the lower portion of the movable member 120 and the catching member 143.

The scraper 160 may include a plurality of scrapers 160, and the plurality of scrapers 160 may be adjacent to each other horizontally and may be pressed by the pressing unit 140. In the scrapers 160 that are adjacent to each other, a left scraper 160A may have a right side end provided with a first inclined part 161 in which the right side end faces a left side end of a right scraper 160B, and the right scraper 160B may have the left side end provided with a second inclined part 162 which corresponds to the first inclined part 161 and which is in close contact with the first inclined part 161 in which the left side end faces the right side end of the left scraper 160A. Any one of the left scraper 160A and the right scraper 160B that are adjacent to each other may have a lubricating liquid injection part 164 and may have a passage 165 for supplying a lubricating liquid from the lubricating liquid injection part 164 to a space between the first inclined part 161 and the second inclined part 162. In the left scraper 160A and the right scraper 160B that are adjacent to each other, a storage part 166 for storing the lubricating liquid may be formed between the first inclined part 161 and the second inclined part 162. A packing 163 may be provided between the right side end and the left side end that are facing each other from the left scraper 160A and the right scraper 160B that are adjacent to each other.

Here, the lubricating liquid may be injected through an inlet of the lubricating liquid injection part 164, the injected lubricating liquid may be stored in the storage part 166 by passing through the passage 165 and then the injected lubricating liquid may permeate between the first inclined part 161 and the second inclined part 162 that are in close contact with each other, and the injected lubricating liquid may be supplied to a surface of the first inclined part 161 and a surface of the second inclined part 162. The lubricating liquid stored in the storage part 166 may be continuously supplied between the first inclined part 161 and the second inclined part 162.

In the left scraper 160A and the right scraper 160B that are adjacent to each other, the first inclined part 161 or the second inclined part 162 may have a surface provided with a plurality of recessed grooves 162a having intervals so as to be spaced apart from each other.

Advantageous Effects

According to an embodiment of the present disclosure, since the lower end part of the scraper 160 is brought into close contact with the surface of the belt 12 with a constant pressure by an automatic pressure maintaining action of the pressing unit 140, foreign substances may be effectively removed from the surface of the belt 12 without leaving any residue.

In addition, according to an embodiment of the present disclosure, by adjusting a close contact angle of the scraper 160, work efficiency may be improved.

In addition, according to an embodiment of the present disclosure, the plurality of scrapers 160 (160A and 160B) are connected to each other, and the scrapers 160A and 160B are capable of removing foreign substances by smoothly moving in the vertical direction according to the curve of the surface of the belt 12.

[Description of Reference Numerals] 10: belt conveyor, 11: roller, 12: belt, 110: body, 111: guide hole, 112: fastener, 120: movable member, 130: vertical moving unit, 131: bracket, 132: position controller, 140: pressing unit, 141: moving shaft, 142: stopping member, 143: catching member, 144: elastic body, 150: mounter, 160: scraper, 161: first inclined part, 162a: recessed groove, 162: second inclined part, 163: packing, 164: lubricating liquid injection part, 165: passage, 166: storage part

BEST MODE

Hereinafter, an embodiment of the present disclosure will be described in detail with reference to the accompanying drawings.

An example of a cleaner device according to an embodiment of the present disclosure is illustrated in FIGS. 1 to 4.

Figure 1:
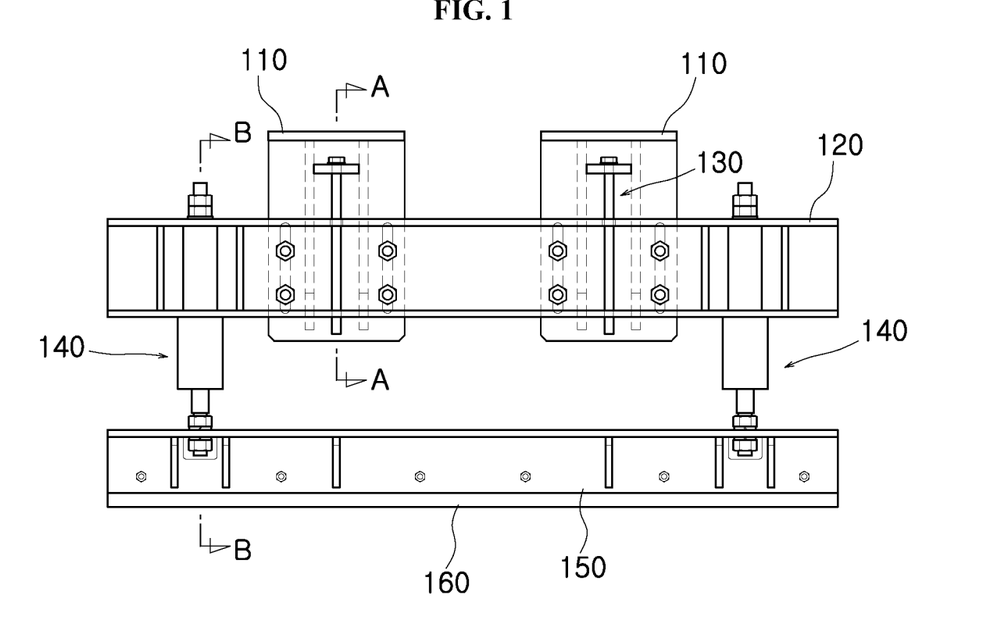
FIG. 1 is a front view illustrating an example of a cleaner device according to an embodiment of the present disclosure.

Referring to FIG. 1, a cleaner device for a belt conveyor according to an embodiment of the present disclosure includes a body 110, a movable member 120 provided on a first side of the body 110 such that the movable member 120 is capable of being moved in a vertical direction, a vertical moving unit 130 for moving the movable member 120 in the vertical direction, a scraping module (see reference numerals 150 and 160) disposed below the movable member 120, and at least one pressing unit 140 pressing the scraping module downward from the movable member 120. The scraping module includes a mounter 150 provided on the pressing unit 140, and includes a scraper 160 supported by the mounter 150. The mounter 150 and the scraper 160 extend in left and right directions and have predetermined lengths. The mounter 150 is disposed on an upper side of the scraper 160. The scraper 160 may be detachably coupled to a lower portion of the mounter 150. A lower end part of the scraper 160 is in contact with a surface of a circulating belt 12 of a belt conveyor 10, thereby removing foreign substances from the surface of the belt 12.

The body 110 is mounted on a side of the belt conveyor 10 such that the lower end part of the scraper 160 is in contact with the surface of the belt 12 and a longitudinal direction of the scraper 160 orthogonally intersects a circulation direction of the belt 12. For example, the body 110 may be mounted on a position adjacent to a roller 11 on which the belt 12 is wound, so that the lower and part of the scraper 160 may be in contact with the surface of the belt 12.

The body 110 includes a plurality of bodies 110, and the plurality of bodies 110 may be disposed to be spaced apart from each other in the left and right directions by a predetermined distance.

Figure 2:
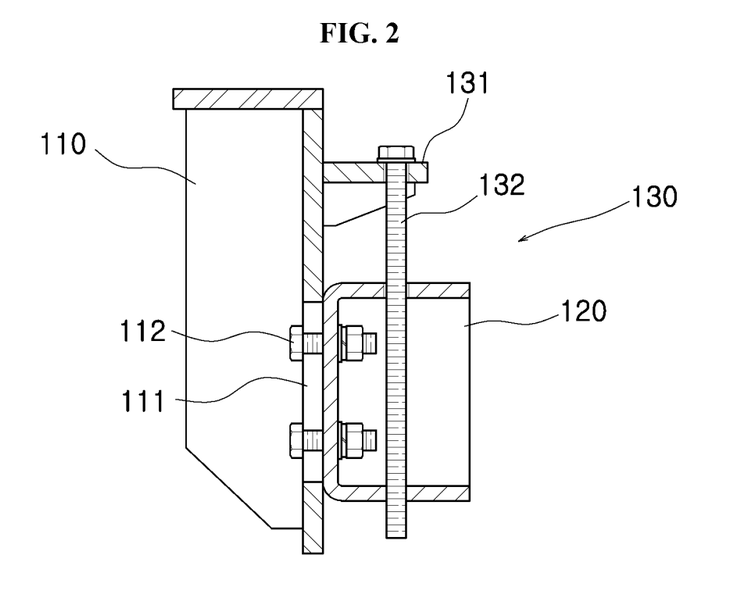
FIGS. 2 and 3 are cross-sectional views respectively taken along lines A-A and B-B in FIG. 1.

The movable member 120 may be moved with respect to the body 110 that is fixed. To this end, as illustrated in FIG. 2, at least one guide hole 111 which extends in the vertical direction and which has a predetermined length is provided in the body 110, at least one fastener 112 is inserted into the guide hole 111 such that the fastener 112 is capable of being moved in the vertical direction along a guide of the guide hole 111, and the movable member 120 is detachably coupled to the fastener 112.

The fastener 112 may include a bolt and a nut. In the fastener 112, the bolt may penetrate the movable member 120 while being in a state in which the bolt is inserted into the guide hole 111, and the nut may be coupled to the bolt that penetrates the movable member 120. When the nut of the fastener 112 is tightened, the movable member 120 is coupled to the bolt of the fastener 112, and the movable member 120 is capable of being fastened to the body 110. When the nut of the fastener 112 is loosened and a fastening force of the movable member 120 to the body 110 is relieved, the movable member 120 is capable of being moved in the vertical direction together with the bolt of the fastener 112 along the length of the guide hole 111. When the nut of the fastener 112 is completely loosened, the movable member 120 is capable of being separated from the bolt of the fastener 112.

According to the vertical moving unit 130, a vertical position of the scraper 160 is capable of being adjusted by moving the scraper 160 in the vertical direction so that the lower end part of the scraper 160 is in contact with the surface of the belt 12. As illustrated in FIG. 2, the vertical moving unit 130 includes a bracket 131 disposed above the movable member 120, and includes a position controller 132 having an upper portion rotatably provided on the bracket 131 and having a lower portion screw-coupled to the movable member 120, the position controller 132 being configured to move the movable member 120 in the vertical direction according to a rotation direction thereof.

A bolt may be used as the position controller 132. The bolt as the position controller 132 is applied such that the bolt is capable of idling around an axis in the vertical direction while the bolt is in a state in which the bolt penetrates the bracket 131 in the vertical direction. Furthermore, as the bolt is screw-coupled to the movable member 120, the vertical position of the movable member 120 is capable of being adjusted to a required position by moving the movable member 120 in the vertical direction according to the rotation direction.

Figure 3:
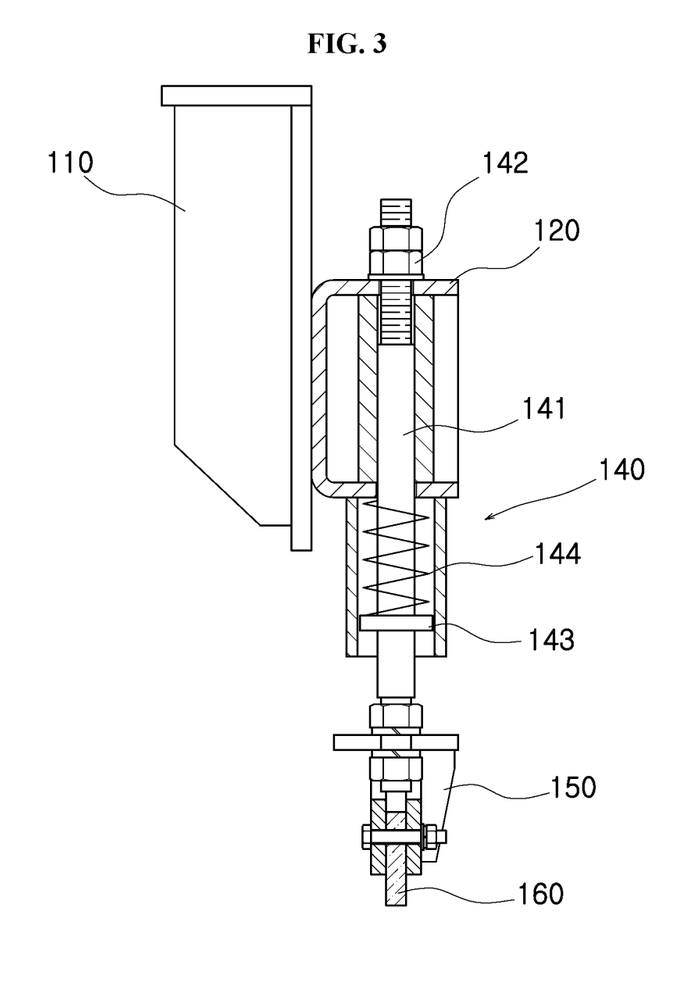

The pressing unit 140 may press the scraper 160 from above the scraper 160 with a predetermined pressure. The pressing unit 140 may automatically maintain a pressing force on the scraper 160 so that the scraper 160 having the lower end part that is in contact with the surface of the belt 12 by the vertical moving unit 130 is always in close contact with the surface of the belt 12. As illustrated in FIG. 3, the pressing unit 140 includes a moving shaft 141, a stopping member 142, a catching member 143, and an elastic body 144.

The moving shaft 141 penetrates the movable member 120 such that the moving shaft 141 is capable of being moved in the vertical direction, and has an upper region that protrudes upward from the upper portion of the movable member 120 and has a lower region that protrudes downward from a lower portion of the movable member 120. The mounter 150 is coupled to a lower end portion of the lower region of the moving shaft 141 in which the lower region protrudes downward, so that the moving shaft 141 is connected to the scraper 160 through the mounter 150.

The stopping member 142 is provided on the upper region of the moving shaft 141 in which the upper region protrudes upward, and limits a downward movement of the moving shaft 141 by being in contact with the upper portion of the movable member 120. The stopping member 142 is screw-coupled to the upper region of the moving shaft 141, and is capable of being moved in the vertical direction along the moving shaft 141 according to the rotation direction thereof. By rotating the stopping member 142 and adjusting the position of the stopping member 142, a distance at which the moving shaft 141 is capable of being downward may be changed.

The catching member 143 is provided on the lower region of the moving shaft 141. The catching member 143 may be formed in a flange shape. Both end parts of the elastic body 144 are supported by the lower portion of the movable member 120 and the catching member 143, and the elastic body 144 provides an elastic force to the moving shaft 141 in a downward direction. The elastic member 144 is a spring, and is capable of being inserted into an outer side of the moving shaft 141 such that the elastic member 144 is positioned between the lower portion of the movable member 120 and the catching member 143.

By a pressing action of the elastic member 144 using the elastic force, the lower end part of the scraper 160 is capable of being maintained in a state of being constantly in close contact with the surface of the belt 12.

The mounter 150 supports the scraper 160 while being in a state in which the upper portion of the scraper 160 is coupled to a lower inner side of the mounter 150, thereby being capable of preventing the scraper 160 from being deformed such as being bent during a foreign substance removing process.

The scraper 160 may have a material and/or a structure advantageous in terms of adhesion to the surface of the belt 12 and a foreign substance removal efficiency. For example, a material of the scraper 160 may include rubber or a synthetic resin.

Figure 5:
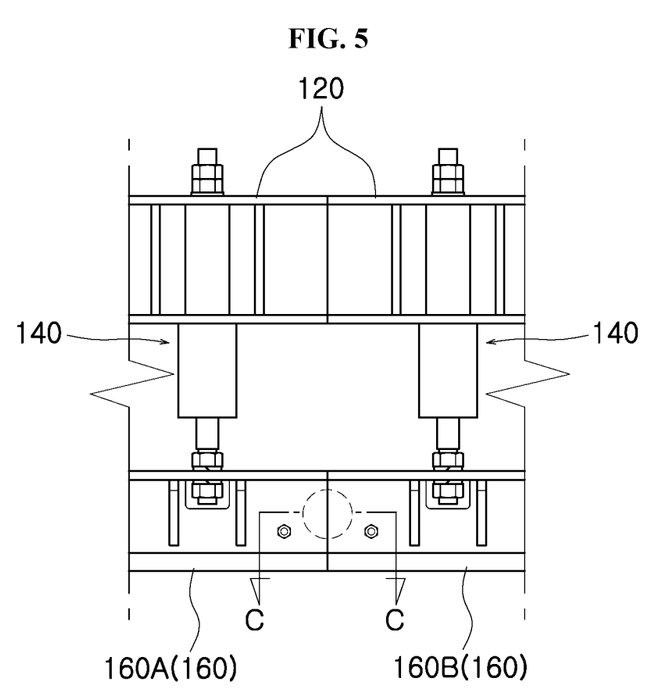
FIG. 5 is a front view illustrating another example of the cleaner device according to an embodiment of the present disclosure.
Figure 6:
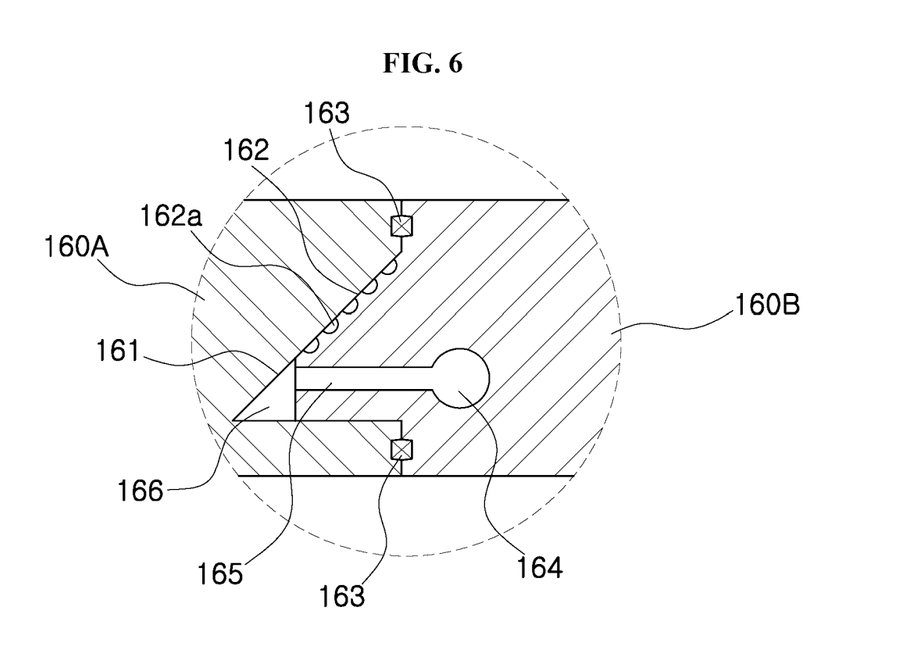
FIG. 6 is a cross-sectional view taken along line C-C in FIG. 5.

Another example of the cleaner device according to an embodiment of the present disclosure is illustrated in FIGS. 5 and 6.

Referring to FIGS. 5 and 6, in another example of the cleaner device according to an embodiment of the present disclosure, all other configurations and actions are the same as the example as illustrated in FIGS. 1 to 4. However, in order to more easily perform maintenance and replacement of the scraper 160 and to more smoothly remove foreign substances by bringing the lower end part of the scraper 160 into closer contact with the surface of the belt 12 even if the surface of the belt 12 is curved, another example of the cleaner device according to an embodiment of the present disclosure is different in that a plurality of scrapers 160 is provided and is adjacent to each other left and right, the plurality of scrapers 160 is pressed by a plurality of pressing units 140, each scraper 160 is more naturally moved in the vertical direction (downward movement by the elastic force of the elastic body 144, and upward movement by overcoming the elastic force of the elastic body 144) in response to the curve of the surface of the belt, and so on. This configuration will be described below.

Since the scrapers 160 are respectively pressed by the pressing units 140, the scrapers 160 may be independently moved in the vertical direction according to the curve of the surface of the belt 12 when the surface of the belt 12 is curved.

FIG. 6 is a cross-sectional view taken along line C-C in FIG. 5. That is, FIG. 6 is a cross-sectional view of a part between a left scraper 160A and a right scraper 160B in the scrapers 160 that are adjacent to each other, the portion being viewed from above.

As illustrated in FIG. 6, in the scrapers 160 that are adjacent to each other, a right side end of the left scraper 160A and a left side end of the right scraper 160B face each other. In the scrapers 160 that are adjacent to each other, a first inclined part 161 is formed on the right side end of the left scraper 160A, and a second inclined part 162 which is in close contact with the first inclined part 161 and which corresponds to the first inclined part 161 is formed on the left side end of the right scraper 160B. The first inclined part 161 may be formed in a shape that is inclined to a left side or a right side from a frontward to a rearward, and the second inclined part 162 may be formed at an angle that corresponds to the first inclined portion 161. By the first inclined part 161 and the second inclined part 162, as the independent vertical movement of the scrapers 160 that are adjacent to each other is allowed, a close contact state of the scrapers 160 adjacent to each other may be actively prevented from being released.

In the scrapers 160 adjacent to each other, any one of the first inclined part 161 of the left scraper 160A and the second inclined part 162 of the right scraper 160B has a surface provided with a plurality of recessed grooves 162 spaced apart from each other by a predetermined distance. As the recessed grooves 162a reduce a close contact area of the corresponding first inclined part 161 and the second inclined part 162, when the surface of the belt 12 is curved, each of the scrapers 160 may be guided to be naturally moved in the vertical direction according to the curve of the surface of the belt 12 during the foreign substance removing process while the scrapers 160 are brought into close contact with the surface of the belt 12.

In the scrapers 160 adjacent to each other, any one of the left scraper 160A and the right scraper 160B has an inner portion provided with a lubricating liquid injection part 164 and has a passage 165 for supplying a lubricating liquid from the lubricating liquid injection part 164 to a space between the first inclined part 161 and the second inclined part 162. As the lubricating liquid supplied between the first inclined part 161 and the second inclined part 162 performs a lubricating action, when the surface of the belt 12 is curved, each of the scrapers 160 may be guided to be more naturally moved in the vertical direction according to the curve of the surface of the belt 12 during the foreign substance removing process while the scrapers 160 are brought into close contact with the surface of the belt 12.

For example, the lubricating liquid injection part 164 extends from an upward to a downward such that the lubricating liquid injection part 164 has a predetermined depth inside the right scraper 160B, and the passage 165 is capable of being connected to the lubricating liquid injection part 164 from inside the right scraper 160B. An inlet at an upper side of the lubricating liquid injection part 164 is in communication with the outside, and is capable of being opened and closed by a plug. By opening the plug such that the inlet of the lubricating liquid injection part 164 is opened, the lubricating liquid is capable of being injected into the lubricating liquid injection part 164. By closing the plug such that the inlet of the lubricating liquid injection part 164 is closed, the lubricating liquid is prevented from being discharged or foreign substances are prevented from being introduced through the inlet of the lubricating liquid injection part 164.

In the scrapers 160 adjacent to each other, a storage part 166 for storing the lubricating liquid is formed between the first inclined part 161 of the left scraper 160A and the second inclined part 162 of the right scraper 160B. The storage part 166 is a predetermined space provided between the corresponding first inclined part 161 and the second inclined part 162, the lubricating liquid from the passage 165 is stored in the storage part 166, and the lubricating liquid stored in the storage part 166 is capable of being supplied between the first inclined part 161 and the second inclined part 162.

In the scrapers 160 adjacent to each other, a packing 163 configured to block the supplied lubricating liquid from being discharged to the outside and configured to prevent foreign substances from being introduced from the outside is provided between the right side end of the left scraper 160A and the left side end of the right scraper 160B. By using the packing 163, a lubricating liquid waste may be prevented by restricting the lubricating liquid supplied between the first inclined part 161 and the second inclined part 162 from being discharged to the outside, and an inhibition of the independent vertical movement of the scrapers 160 caused by the outside foreign substances that is introduced between the first inclined part 161 and the second inclined part 162 may be prevented. Such a packing 163 may be formed in various shapes and may be formed of various materials.

While the present disclosure has been described above, the present disclosure is not limited to the disclosed embodiment and the accompanying drawings, and those skilled in the art may variously modify the present disclosure without departing from the technical features of the present disclosure.

The invention claimed is:

1. A cleaner device for a belt conveyor, the cleaner device comprising:
   a body (110);
   a movable member (120) provided so as to be capable of being moved vertically;
   a vertical moving unit (130) for moving the movable member (120);
   a scraper (160) which is disposed below the movable member (120) and which extends horizontally, the scraper (160) having a lower end part that is in contact with a surface of a belt (12) of a belt conveyor (10), thereby removing foreign substances from the surface of the belt (12); and
   a pressing unit (140) comprising at least one of pressing units (140) provided on the movable member (120) and being configured to press the scraper (160), the pressing unit (140) being configured to automatically maintain a pressing force on the scraper (160) so that the lower end part of the scraper (160) is in close contact with the surface of the belt (12),
   wherein the scraper (160) comprises a plurality of scrapers (160) and the plurality of scrapers (160) is adjacent to each other horizontally and is pressed by the pressing units (140),
   in the scrapers (160) that are adjacent to each other, a left scraper (160A) has a right side end provided with a first inclined part (161) and a right scraper (160B) has a left side end provided with a second inclined part (162) which corresponds to the first inclined part (161) and which is in close contact with the first inclined part (161),
   any one of the left scraper (160A) and the right scraper (160B) that are adjacent to each other has a lubricating liquid injection part (164) and has a passage (165) for supplying a lubricating liquid from the lubricating liquid injection part (164) to a space between the first inclined part (161) and the second inclined part (162),
   a storage part (166) for storing the lubricating liquid is formed between the first inclined part (161) and the second inclined part (162), and
   a packing (163) is provided between the right side end and the left side end that are facing each other from the left scraper (160A) and the right scraper (160B), and wherein each of the pressing units (140) comprises:

a moving shaft (141) that penetrates the movable member (120) such that the moving shaft (141) is capable of being moved vertically, the moving shaft (141) having an upper region that protrudes upward from an upper portion of the movable member (120) and having a lower region that protrudes downward from a lower portion of the movable member (120), and the moving shaft (141) having a lower end part of the lower region connected to the scraper (160);

a stopping member (142) provided on the upper region of the moving shaft (141) and configured to limit a downward movement of the moving shaft (141) by being in contact with the upper portion of the movable member (120);

a catching member (143) provided on the lower region of the moving shaft (141); and an elastic body (144) inserted into an outer side of the moving shaft (141) while being in a state in which both end parts of the elastic body (144) are supported by the lower portion of the movable member (120) and the catching member (143).

2. The cleaner device of claim 1, wherein the body (110) is provided with a guide hole (111) that extends vertically, a fastener (112) is inserted into the guide hole (111) such that the fastener (112) is capable of being moved vertically along a guide of the guide hole (111), and the movable member (120) is detachably coupled to the fastener (112).

3. The cleaner device of claim 1, wherein the vertical moving unit (130) comprises:

a bracket (131) provided on the body (110) above the movable member (120); and a position controller (132) having an upper portion rotatably provided on the bracket (131) and having a lower portion screw-coupled to the movable member (120), the position controller (132) being configured to move the movable member (120) vertically according to a rotation direction thereof.

4. The cleaner device of claim 1, wherein the first inclined part (161) or the second inclined part (162) has a surface provided with a plurality of recessed grooves (162*a*) having intervals so as to be spaced apart from each other.

* * * * *